United States Patent Office 3,414,710
Patented Dec. 3, 1968

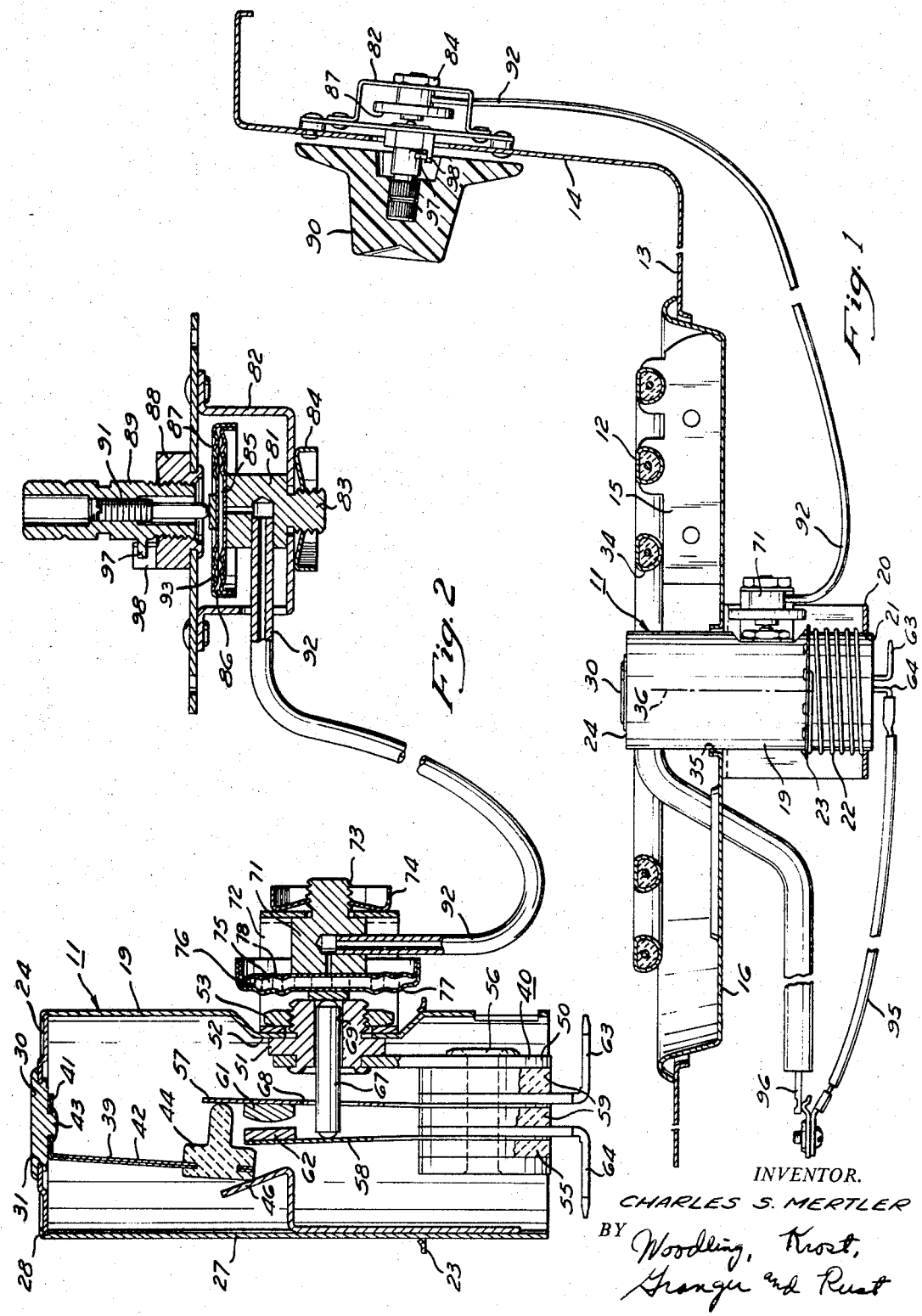

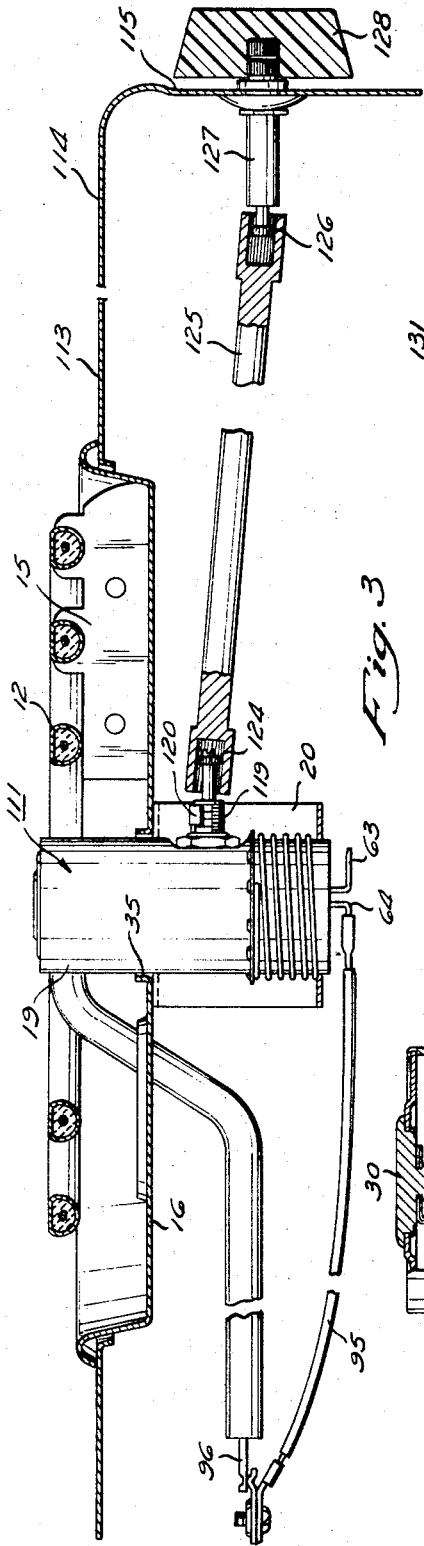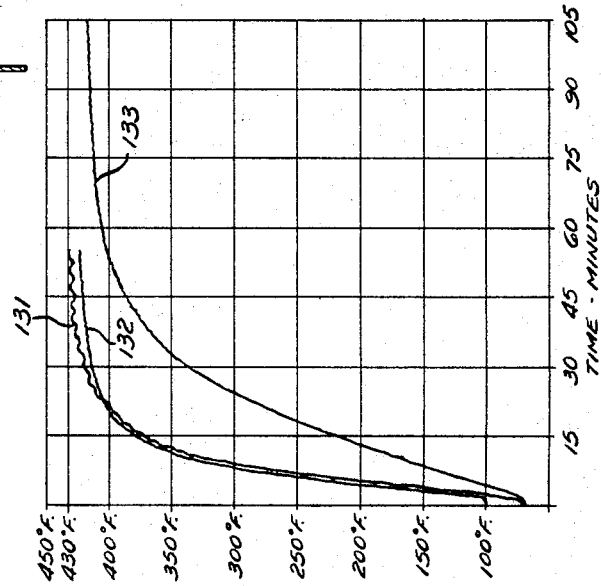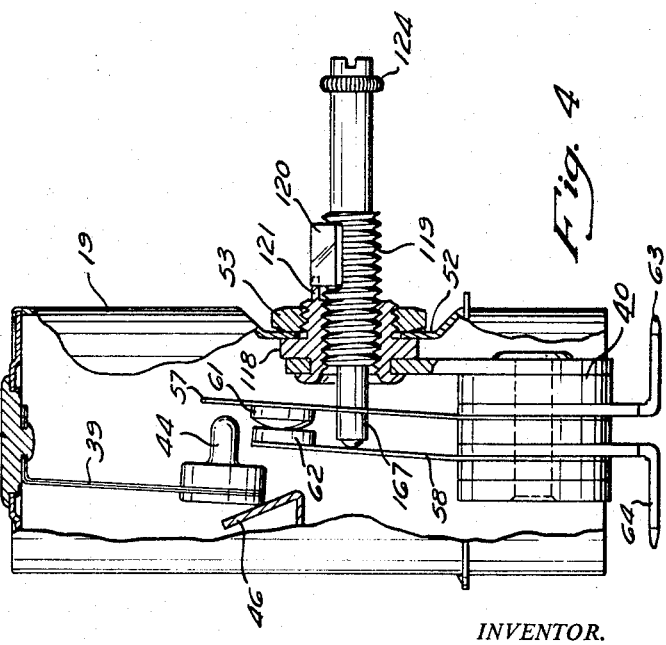

3,414,710
THERMOSTATIC SWITCH ASSEMBLY
AND SENSOR
Charles S. Mertler, Mansfield, Ohio, assignor, by mesne assignments, to Essex Wire Corporation, Fort Wayne, Ind., a corporation of Michigan
Filed Sept. 9, 1965, Ser. No. 486,026
15 Claims. (Cl. 219—450)

ABSTRACT OF THE DISCLOSURE

A thermostatic switch assembly wherein temperature responsive means such as a bimetal blade senses the temperature of an appliance and controls electrical switch contacts in turn controlling electrical energy flowing to the appliance to change the temperature thereof. Actuator means is provided to adjust the temperature of operation of the switch contacts from a remote location, with either a hydraulic or a mechanical linkage between the remote location and the switch assembly.

---

The invention relates in general to thermostatic switch assemblies and more particularly to a thermostatic switch assembly for a heater for an appliance.

Heating appliances take many forms, heated by both electrical and gas heaters. Such appliances may take the form of small household appliances as grills, griddles, waffle irons, ovens, sandwich toasters, etc., as well as vessels heated on a surface heater, including those on ranges and hot plates.

Electric ranges and the like have used electrical surface heaters to heat cooking vessels as an example of the appliance controllable in temperature by the switch assembly of this invention. In many cases a sensor has been mounted in a central aperture of the surface heater to sense the temperature of the vessel and in turn to control the energization to the heater so as to control the temperature of the vessel. In many cases these sensor assemblies have incorporated a resistance variable with temperature to control a thermostatic switch assembly mounted at a remote location. However in many such cases flexible electrical wires have been used to connect the sensor and the control assembly and these flexible wires were often subject to breakage because of flexing due to the spring mounting of the sensor relative to the surface heater. In other cases where the sensor combined the thermostatic switch assembly for direct control of energization of the surface heater, the physical size and thermal mass of the sensor became so large that the unit was sluggish in operation and also the electrical contacts were subject to the heat from the heater as well as the heat of arcing so that these contacts would not have a long life and the unit became unsatisfactory. In other cases the use of a sensor in the center of a surface heater required the use of a separate relay device to amplify the power in order to have sufficient force to actuate the power contacts controlling the electrical energization to the surface heater. This required a more complex and expensive construction with a set of pilot contacts and a set of power contacts in addition to the relay device.

Accordingly an object of the invention is to obviate the above mentioned disadvantages.

Another object of the invention is to provide a combined thermostatic switch assembly and sensor which is rugged, foolproof, inexpensive, has extreme simplicity, and has no wires to break.

Another object of the invention is to provide a thermostatic switch assembly and sensor which may directly control energization to a heater without use of any pilot contacts or relay device.

Another object of the invention is to provide a thermostatic switch assembly and sensor which may be adjusted in temperature range from a remote location.

Another object of the invention is to provide a combined thermostatic switch assembly and electric heater with a sensor in the center thereof which switch assembly directly controls energization to the heater yet the switch assembly may be adjusted in operating temperature range from a position beyond the peripheral edge of the surface heater.

Another object of the invention is to provide a thermostatic switch assembly and sensor wherein the switch mechanism is removable relative to the bimetal which actuates the switch mechanism.

Another object of the invention is to provide a sensor unit with a small thermal mass yet directly controlling a switch assembly capable of controlling the entire electrical heater load.

The invention may be incorporated in a thermostatic switch assembly including a frame, a bimetal blade having a first portion mounted in a sensing surface of the frame for heat transmission from a heater via an appliance, a switch mechanism mounted separately from said bimetal blade, first and second contacts in said switch mechanism relatively moved from said bimetal blade, actuator means in said switch mechanism movable to relatively move said first and second contacts, means to connect said first and second contacts to control the heater, and temperature selector means connected to move said actuator means to adjust the temperature of operation of said switch assembly and accordingly the temperature of operation of the heater and appliance.

Other objects and a fuller understanding of the invention may be had by referring to the following description and claims, taken in conjunction with the accompanying drawings in which:

FIGURE 1 is a longitudinal sectional view of a surface heater and thermostatic switch assembly embodying the invention;

FIGURE 2 is an enlarged sectional view of the thermostatic switch assembly and remote control;

FIGURE 3 is a longitudinal sectional view of a surface heater and modified thermostatic switch assembly;

FIGURE 4 is an enlarged view, partly in section, of the modified thermostatic switch assembly of FIGURE 3; and FIGURE 5 is a graph of temperature versus time.

FIGURES 1 and 2 illustrate a preferred embodiment of a thermostatic switch assembly 11 for use in combination with a heater 12. This is only illustrative of one form which the invention may take. The heater 12 has been shown as an electrical surface heater 12. This surface heater 12 may be on an electric range having a cooking top 13 and a back-splash 14. The heater 12 may be mounted on a spider 15 and supported in a drip pan 16 carried on the cooking top 13.

The thermostatic switch assembly 11 includes generally a housing or frame 19. A U-shaped bracket 20 may be fixed on the underside of the drip pan 16. A circular aperture 21 may be provided in the bracket 20 to receive the cylindrical housing 19. A compression spring 22 surrounds the housing 19 and is disposed between the bottom of the bracket 20 and a shoulder 23 on the housing 19. This compression spring 22 urges the housing 19 upwardly so that the top 24 of the housing 19 is disposed above the level of the upper surface of the heater 12.

FIGURE 2 better shows the construction of the thermostatic switch assembly 11. The housing 19 may be an inverted cup shaped housing of suitable material. One suitable material is stainless steel because it acts as a heat trap having relatively poor heat conductivity relative to aluminum and copper. This cup shaped housing 19 may have a general cylindrical side wall 27 and the flat top 24 to make it a cup shaped housing. The top 24 may be an apertured disc separate from the cylindrical side wall 27 and crimped thereto at 28. This construction in two separate pieces facilitates manufacture and also acts as an additional heat trap interrupting the flow of heat from the top 24 to the side wall 27.

A sensor cap or button 30 is disposed as a sensing surface of the frame or housing 19. The button 30 is disposed through an aperture 31 in the top 24 to close this top 24. This sensor cap may be made of suitable material preferably one of high heat conductivity such as aluminum. It may be riveted or crimped in place at the aperture 31. The upper surface of this sensor button 30 is preferably flat or very slightly rounded for good heat transmission or conductivity from any cooking vessel placed on the surface heater 12.

As better shown in FIGURE 1 the thermostatic switch assembly 11 is mounted in a central aperture 34 of the surface heater 12 and is closely and slidably received in a central aperture 35 in the drip pan 16. This aperture 35 and the aperture 21 guide the housing 19 for vertical movements parallel to the axis 36 of housing 19.

The thermostatic switch assembly 11 includes generally a bimetal blade 39 and a switch mechanism 40. The bimetal blade 39 is bent generally in an L shape with first and second legs 41 and 42 respectively. The first leg 41 is riveted to the underside of the sensor button 30 by riveting over an integral stud 43 on the underside of this sensor button 30. This construction permits superior heat conductivity through the thin sensor button 30 directly to the bimetal blade 39. The second leg 42 of the bimetal blade 39 depends downwardly from the top 24 generally parallel to the axis 36. The lower end of this bimetal blade leg 42 carries an insulator button 44 which may be made of suitable material such as porcelain. A rear wall of housing 19 carries a positive off abutment 46 fixed thereto, as by welding. The positive off abutment 46 has a generally Z shape so that the upper free end thereof may be bent slightly for calibration adjustment purposes to abut the rear of the insulator button 44.

The switch mechanism 40 includes a rigid base 50 with a threaded stud riveted thereto. This threaded stud 51 extends through a flattened side wall 52 of the housing 19. A nut 53 is threaded on the stud 51 in order to removably mount this switch mechanism 40 on the housing 19. The switch mechanism 40 may be a stack type mechanism having a stack 55 fixedly carried on the base 50 as by a rivet 56. First and second contact blades 57 and 58 are fixedly carried in the stock 55 and insulated from the base 40 by insulating washers 59. First and second contacts 61 and 62 are carried on the outboard ends of the first and second contact blades 57 and 58 respectively. Terminals 63 and 64 are fixed in the stack 55 and are in electrical connection with the first and second contact blades 57 and 58, respectively. The first and second blades 57 and 58 extended upwardly from the stack 55 while is mounted in the bottom of the housing 19 and these blades extend generally parallel to the axis 36 of this housing 19. The first contact blade 57 has an outer end extending into close proximity to the front of the insulator button 44 to be actuated thereby upon temperature changes. The bimetal blade leg 42 moves to the right, as viewed in FIGURE 2, upon increase in temperature so that the contacts 61 and 62 will ultimately be separated.

Actuator means 67 may be an elongated insulator extending through an aperture 68 in the first blade 57. This insulator actuator means 67 is movable along its length along a second axis transverse to the central axis 36 and generally perpendicular to this second blade 58. This actuator means 67 is adjustable along the transverse axis to position the second contact 62 to thus adjust the temperature of operation of the thermostatic switch assembly 11 and accordingly to adjust the temperature of any cooking vessel on the surface heater 12. The insulator actuator means 67 is longitudinally slidable in an aperture 69 in the threaded stud 51 in order to guide the sliding movement of this insulator means 67.

A hydraulic receiver unit 71 is fixedly mounted on a bracket 72 by a threaded stud 73 and a nut 74. The bracket 72 is fixed to the side wall 52 of the housing 19 by means of the nut 53. This hydraulic receiver unit 71 includes a hydraulic chamber 75 containing a hydraulic fluid 76. A diaphragm 77 forms a movable wall in the hydraulic chamber 75 to be movable with changes of pressure of the fluid 76. This diaphragm 77 acts on the insulator actuator means 67 to move it longitudinally. The rear wall 78 of the chamber 75 may also be a diaphragm to move forwardly at the periphery thereof with increased pressure inside the chamber. This will add to the total movement of the actuator means 67.

A hydraulic sender unit 81 is fixedly carried on a bracket 82 by means of a threaded stud 83 and a nut 84. The hydraulic sender unit 81 includes a hydraulic chamber 85 containing a hydraulic fluid 86. A diaphragm 87 constitutes a movable wall of the hydraulic chamber 85. This sender unit chamber 85 may also have a deflectable diaphragm as the rear wall 93. A nut 88 is fixed on the bracket 82 and receives a threaded screw 89. This bracket 82 may be mounted on the back-splash 14 of a range, for example, and the outer end of the threaded screw 89 receives a temperature selector means or control knob 90 to rotate the screw 89 and thus move the diaphragm 87. A trimmer screw 91 for initial calibration purposes is threaded inside the screw 89 to engage the diaphragm 87. A fluid conduit 92 interconnects the hydraulic chambers 75 and 85 and is filled with fluid to transmit movement of the sender diaphragm 87 to the receiver diaphragm 77. This fluid conduit 92 may be small in diameter for example similar to capillary tubing.

The thermostatic switch assembly 11 directly controls energization to the surface heater 12 rather than requiring any relay device to amplify the power. To this end an electrical conductor 95 may be directly connected between the terminal 64 and a terminal 96 on the surface heater 12. Accordingly electrical energization for example from a 240 volt supply may be directly applied to the thermostatic switch assembly 11 and through this switch assembly to the electrical heater 12.

OPERATION

In operation the thermostatic switch assembly 11 controls the temperature of an appliance via the heater 12. In this illustration, it controls the temperature of any vessel placed on the surface heater 12. The compression spring 22 is made with little force so that even a light vessel placed on the heater 12 will compress the spring 22 yet permit conductivity of heat from the vessel to the sensor button 30. The control knob 90 has rotational limits, for example about 300 degrees of arc, between first and second rotational limit positions as a stop lug 97 on the screw 89 engages a stop boss 98 on the nut 8. At the first rotational limit, the hydraulic chamber 85 is compressed to a maximum amount to force fluid into the hydraulic chamber 75 of the receiver unit 71 and thus move the insulator actuator means 67 to the left as viewed in FIGURE 2. This will establish a first axial limit position of this actuator means 67 at the position shown at FIGURE 2 whereat the contacts 61 and 62 will be out of engagement at normal room temperature. The positive off abutment 46 may engage the insulator 44 at room temperature or preferably will not engage insulator 44 until some lower temperature such as 30° F. is reached. The first contact blade 57 normally urges the contact 61 to the left and the second contact blade 58 normally urges the second contact 62 to the right so that these contacts are in mutual engagement. If the control knob 90 is now rotated toward the second rotational limit, this will relieve pressure on the sensor diaphragm 87 and the second contact blade 58 moves toward closing contacts 61 and 62. Also blade 58 urges receiver diaphragm 77 to the right and this forces fluid back into the sender unit 81. This will establish the position of the contact 62 for a desired operating temperature of any cooking vessel. Accordingly the heater 12 will be energized through the now closed contacts 61 and 62. The heater will heat, heating the vessel and in turn heating the sensor button 30 and bimetal blade 39. This heat will warp the blade leg 42 to the right to open the contacts 61 and 62. This will deenergize the heater 12 and cool the vessel and bimetal blade 39 so that it warps back to the left to close contacts 61 and 62. This cycle of on and off conditions of the contacts will continue, thus maintaining the vessel at the preset operating temperature range, as set by the control knob 90. Suitable calibration marks may of course be provided on the knob 90 relative to the back-splash 14.

FIGURE 3 illustrates a modification of the invention wherein a thermostatic switch assembly 111 is provided which in many ways is similar to the switch assembly 11 of FIGURES 1 and 2. Where the parts are identical, the same reference numerals are employed as in FIGURES 1 and 2. This thermostatic switch assembly 111 again controls a heater 12 mounted on a cooking top 113 of a hot plate 114 having a front wall 115. The thermostatic switch assembly 111 is again mounted in a housing 19 which includes the bimetal blade 39 and the stack type switch mechanism 40. This switch mechanism is mounted on the flattened side wall 52 of the housing which now is disposed at the front of the housing 19. The switch mechanism 40 is carried on a threaded stud 118 extending through an aperture in the side wall 52. The nut 53 fastens this threaded stud 118 and hence the switch mechanism 40 to the housing 19. The stud 118 is internally threaded to receive a threaded screw 119 carrying an insulator actuator means 167. Rotation of this threaded screw 119 thus axially moves the insulator actuator means 167 to adjustably position the second contact blade 58. A stop lug 120 on the screw 119 co-operates with a stop boss 121 on the threaded stud 118 in order to provide first and second rotational limits of the threaded screw 119.

The outer end of the screw 119 is knurled at 124 to receive the splined end of a screw extension or rod 125. This screw extension 125 extends to a knurled end 126 of a shaft 127 journaled in the front wall 115 of the hot plate 114. A control knob 128 is fixed on the outer end of the shaft 127 to rotate the screw 119 and thus adjust the temperature of operation of any vessel on the hot plate heater 12. The rod 125 is a double ended universal joint permitting the switch assembly 111 to move vertically without interference from the rotary connection to the knob 128.

OPERATION

The thermostatic switch assembly 111 of the modification of FIGURES 3 and 4 operates in essentially the same manner as the switch assembly 11 of FIGURES 1 and 2. The control knob 128 may be rotated to a first rotational limit as determined by the stop lug 120 and stop boss 121. At this rotational limit position the screw 119 will be threaded into the threaded screw 118 so that the contact blade 58 is moved to the left as viewed in FIGURE 4, sufficiently to open the contacts 61 and 62. With the insulator button 44 engaging the positive off abutment 46, this establishes the contacts 61 and 62 out of engagement. This assures that the heater 12 will not become energized and will not present a dangerous condition. A dangerous condition otherwise might exist if a cardboard box for example happened to be placed on the surface heater 12. Such a cardboard box would not transmit much heat to the sensor button 30 and hence would not cause the bimetal blade 39 to warp to open the contacts 61 and 62. Accordingly such cardboard box might be set afire if the positive off abutment 46 were not provided to assure that the contacts would be separated at the off position of the knob 128. The positive feature in FIGURES 1 and 2 provides the same function.

The setting of the control knob 128 at a desired operating temperature will adjust the position of the contact blade 58 so that the contacts 61 and 62 will cycle on and off to maintain the vessel on the surface heater 12 at the desired temperature.

FIGURE 5 shows performance curves of the present thermostatic switch assembly 11 or 111 and other thermostatic switch assemblies available. Curve 131 is a performance curve of the present thermostatic switch assembly of time vs. temperature made by a recording thermometer. The test was conducted with a three quart stainless steel pan containing six cups of oil such as might be used for french frying. A 1,500 watt, 240 volt heater was used and a thermocouple was located in the oil at the center of the pan approximately ½ inch from the bottom. This thermocouple sensed the temperature of the oil and produced the performance curve 131. The same conditions of test resulted in a performance curve 132 of a competitive sensor device with a variable resistance sensor contacting the center bottom of the pan and with this sensor controlling a remotely mounted control circuit having pilot contacts which in turn controlled a relay to control power contacts supplying energization to the electrical surface heater. A curve 133 is of a second competitive thermostatic switch assembly having a large diameter sensor in the center of the electrical surface heater engaging the center bottom of the vessel and directly controlling power contacts controlling energization to the electrical surface heater. In comparing these three performance curves it will be seen that the thermostatic switch assembly of the present invention had a performance equally as good, if not better than the performance curve 132 of the much more expensive sensor unit with remotely mounted control circuit having pilot contacts and a relay to control the power contacts. The present invention also had a much better performance than the competitive sensor, shown by curve 133, which directly controlled the power contacts but had a very large thermostatic switch assembly. It will be seen that the thermostatic switch assembly of the present invention reaches a stable temperature of operation in about only one-half the length of time as the competitive sensor, shown in curve 133. The long time for the switch assembly of curve 133 to reach operating temperature renders such unit commercially unacceptable.

The performance 131 of the present invention also illustrates that the switch assembly will have much longer contact life than the competitive units because of less frequent on and off operations. Further the competitive units each have built in anticipator units to give allegedly fast heat up without appreciable overshoot of the preselected temperature. Despite the lack of an anticipator unit in the present invention, the comparative curves shows the excellent results obtained by the present invention without the added cost and complexity of an anticipator.

The thermostatic switch assemblies 11 and 111 provide a simple, rugged, and economical control of the temperature of any vessel on the surface heater 12. The sensor 30, bimetal 39, and switch mechanism 40 are all mounted in the housing 19 without requiring any separate power contacts or relay devices to control the actual energization to the surface heater 12. The contacts 61 and 62 directly control the energization to the heater 12. Also the screw extension 125 or the fluid conduit 92 provide adjustment of the operating temperature from a position beyond the periphery of the surface heater 12. The switch mechanism 40 is mounted separately from the bimetal blade 39 in the housing 19. This has several advantages. A first advantage is that the switch mechanism 40 is easily mountable by the nut 53 and as easily removable thus the switch mechanism may be removed for replacement or repair should this ever become necessary without disturbing calibrated position of the bimetal blade 39. A second advantage is that the mass of the switch mechanism 40 is removed from the location of direct heat conductivity from the vessel to the sensor button 30 and the bimetal blade 39. Heat is rapidly transmitted through the thin sensor button 30 directly to the bimetal blade 39 for prompt heat response by the bimetal blade 39. The fact that the housing 19 is made of two parts and preferably of stainless steel provided a good heat trap to prevent heat loss into the housing 19. Accordingly the heat is channeled into the bimetal blade 39 to make a more rapidly acting thermostatic switch assembly and to limit the heat flow to the contacts 61 and 62 so that they have a longer life. A thermostatic switch assembly embodying the present invention has been operated on a 2,700 watt heater at 240 volts for 500,000 cycles of operation with satisfactory results and without failure. Thus the unit is very simple, rigid, and reliable. The electrical conductor 95 is of a large diameter conductor in order to carry the heavy current to the heater 12 which may be up to 2,700 watts, for example, and thus there are no fine wires to any sensor device which are subject to flexing and hence breakage, accelerated by brittleness caused by the heat of the heater 12.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. A thermostatic switch assembly comprising, in combination,
   a frame,
   temperature responsive means having first and second portions,
   means mounting said first portion on said frame,
   a switch mechanism,
   means mounting said switch mechanism on said frame,
   first and second contacts in said switch mechanism,
   means to relatively move said first and second contacts from said temperature responsive means second portion,
   a hydraulic sender unit adapted to be mounted at a remote distance from said frame,
   a hydraulic receiver unit,
   means to mount said hydraulic receiver unit fixed relative on said frame,
   a hydraulic chamber in each of said units,
   a movable wall in each of said chambers,
   a conduit interconnecting said hydraulic chambers in said units,
   fluid in said conduit and chambers to transmit motion of one movable wall to the other,
   means in said receiver unit to transmit motion of said movable wall therein to relatively move said contacts,
   and temperature selector means in said sender unit acting on said movable wall therein to in turn act on the fluid in said chambers to adjust the temperature of operation of said switch assembly.

2. A thermostatic switch assembly for use with a heater for an appliance,
   said switch assembly including a frame having a sensing surface,
   temperature responsive means having first and second legs,
   means mounting said first leg to said sensing surface of said frame for heat conduction thereto from the appliance heated by the heater,
   said second leg being displaced out of the plane of said first leg,
   a switch mechanism,
   means mounting said switch mechanism on said frame separately from said temperature responsive means,
   first and second contacts in said switch mechanism and adapted to be connected to control the heater and the heat output thereof to the appliance,
   means to relatively move said first and second contacts from said second leg,
   a hydraulic sender unit adapted to be mounted at a remote distance from said frame,
   a hydraulic receiver unit mounted fixed relative to said frame,
   a hydraulic chamber in each of said units,
   a movable wall of each of said chambers,
   a conduit interconnecting said hydraulic chambers in said units,
   fluid in said conduit and chambers to transmit motion of one movable wall to the other,
   means in said receiver unit to transmit motion of said movable wall therein to relatively move said contacts,
   and temperature selector means in said sender unit acting on said movable wall therein to in turn act on the fluid in said chambers to adjust the temperature of operation of said switch assembly and accordingly the temperature of operation of any said appliance.

3. A thermostatic switch assembly for use with an electrical heater for an appliance,
   said switch assembly including a frame having a sensing surface,
   a bimetal blade bent into generally an L shape with one leg carried at the sensing surface of said frame for heat conduction thereto from an appliance heated by the heater and the other leg extending away from said sensing surface,
   a switch mechanism,
   means mounting said switch mechanism on said frame separately from said bimetal blade,
   first and second contacts in said switch mechanism and adapted to be connected to directly control the energization to the electrical heater,
   means to relatively move said first and second contacts from said bimetal blade other leg,
   a hydraulic sender unit adapted to be mounted at a remote distance from said frame,
   a hydraulic receiver unit mounted on said frame,
   a hydraulic chamber in each of said units,
   a movable wall in each of said chambers,
   a conduit interconnecting said hydraulic chambers in said units,
   fluid in said conduit and chambers to transmit motion of one movable wall to the other,
   means in said receiver unit to transmit motion of said movable wall therein to relatively move said contacts,
   and temperature selector means in said sender unit acting on said movable wall therein to in turn act on the fluid in said chambers to adjust the temperature of operation of said switch assembly and accordingly the temperature of operation of any said appliance.

4. A thermostatic switch assembly for use with an electrical heater having an upper surface adapted to receive a vessel and having a central aperture to receive the switch assembly,
   said switch assembly including a frame having a top,
   a bimetal blade bent into generally an L shape with one leg carried at the top of said frame for heat conduction thereto from a vessel on the surface heater and the other leg depending downwardly from the top of said frame, a switch mechanism with a base, means mounting said base on said frame separately from said bimetal blade, first and second contacts in said switch mechanism carried on said base and adapted to be connected to directly control the energization to the electrical heater, means to relatively move said first and second contacts from said bimetal blade, a hydraulic sender unit adapted to be mounted at a remote distance from said frame, a hydraulic receiver unit mounted on said frame, a hydraulic chamber in each of said units, a movable wall in each of said chambers, a conduit interconnecting said hydraulic chambers in said units, fluid in said conduit and chambers to transmit motion of one movable wall to the other, means in said receiver to transmit motion of said movable wall therein to relatively move said contacts, and control means in said sender unit acting on said movable wall therein to in turn act on the fluid in said chambers to adjust the temperature of operation of said switch assembly and accordingly the temperature of operation of any said vessel.

5. A thermostatic switch assembly for use with an electrical heater having an upper surface adapted to receive a vessel and having a central aperture to receive the switch assembly, said switch assembly including a frame having a top, a bimetal blade bent into an L-shape with one leg carried at the top of said frame for heat conduction thereto from a vessel on the surface heater and the other leg depending downwardly from the top of said frame, a switch mechanism with a base, means removably mounting said base on said frame separately from said bimetal blade, first and second blades in said switch mechanism fixed on said base with first and second contacts carried on said first and second blades for mutual co-operation and adapted to be connected to directly control the energization to the electrical heater, means to relatively move said first and second blades from said bimetal blade, a hydraulic sender unit adapted to be mounted at a remote distance from said frame, a hydraulic receiver unit mounted on said frame, a hydraulic chamber in each of said units, a movable wall in each of said chambers, a conduit interconnecting said hydraulic chambers in said units, fluid in said conduit and chambers to transmit motion of one movable wall to the other, receiver unit connecting said movable wall therein to said second blade to adjust the position of same, and control means in said sender unit acting on said movable wall therein to in turn act on the fluid in said chambers to adjust the temperature of operation of said switch assembly and accordingly the temperature of operation of any said vessel.

6. A surface heater and control bimetal switch assembly comprising, in combination, an electrical surface heater having an upper surface adapted to receive a vessel, a central aperture in said surface heater, a switch assembly disposed in said central aperture, said switch assembly including a housing having a top, a sensing button fixedly disposed in said top for abutment by a vessel on said surface heater, a bimetal blade bent into an L-shape with one leg fastened to said sensing button and the other leg depending within said housing, a switch mechanism with a base, means mounting said base on said housing separately from said bimetal blade, first and second blades in said switch mechanism fixed on said base with said first blade extending into close proximity to said bimetal blade to be actuated thereby, first and second contacts carried on said first and second blades for mutual co-operation, actuator means in said switch mechanism movable generally perpendicular to said second blade to adjust the position of same, first and second axial limits of said actuator means relative to said housing, a positive off abutment fixed on said housing and acting on said bimetal blade at normal room temperature thereof to maintain said contacts out of engagement with said actuator means at said first axial limit thereof, means directly connecting said first and second contacts in series with said electrical heater to control the energization thereto, and a manual control knob connected to move said actuator means to adjust the temperature of operation of said switch assembly and accordingly the temperature of operation of the vessel.

7. A surface heater and control bimetal switch assembly and set forth in claim 6, wherein said actuator means includes a mechanical linkage between said manual control knob and said second blade.

8. A thermostatic switch assembly for use with an electrical heater having an upper surface adapted to receive a vessel and having a central aperture to receive the switch assembly, said switch assembly including a frame having a top, a sensing button fixedly disposed on said top of said frame for abutment by a vessel on the surface heater, a bimetal blade bent into an L-shape with one leg fastened to said sensing button and the other leg depending downwardly within said frame, a switch mechanism with a base, means mounting said base on said frame separately from said bimetal blade, first and second blades in said switch mechanism fixed on said base with said first blade extending into close proximity to the bimetal blade to be actuated thereby, first and second contacts carried on said first and second blades for mutual co-operation and adapted to be connected to directly control the energization to the electrical heater, a hydraulic receiver unit mounted on said frame including actuator means on said frame movable generally perpendicular to said second blade to adjust the position of one of said blades, a hydraulic sender unit adapted to be mounted at a remote distance from said frame, a hydraulic chamber in each of said units, a movable wall in each of said chambers, a conduit interconnecting said hydraulic chambers in said units, fluid in said conduit and chambers to transmit motion of one movable wall to the other, and control means in said sender unit acting on said movable wall therein to in turn act on the fluid in said chambers to adjust the temperature of operation of said switch assembly and accordingly the temperature of operation of any said vessel.

9. A thermostatic switch assembly for use with an electrical heater having an upper surface adapted to receive a vessel and having a central aperture to receive the switch assembly, said switch assembly including a frame having a top, a sensing button fixedly disposed on said top of said frame, spring means urging said sensing button upwardly for abutment by any vessel on the surface heater, a bimetal blade bent into an L-shape with one leg fastened to said sensing button and the other leg depending downwardly within said frame, a switch mechanism with a base, means mounting said base on said frame separately from said bimetal blade, first and second blades in said switch mechanism fixed on said base with said first and second blades extending generally upwardly, said first blade extending into close proximity to said bimetal blade to be actuated thereby, first and second contacts carried on said first and second blades for mutual co-operation and adapted to be connected to directly control the energization to the electrical heater, a hydraulic receiver unit mounted on said frame, a diaphragm in said receiver unit movable generally perpendicular to said second blade, insulator means on said receiver unit acting on said second blade to adjust the position of same, first and second axial limits of said insulator means relative to said frame, a positive off abutment fixed on said frame and adapted to act on said bimetal blade at normal room temperature thereof to maintain said contacts out of engagement with said insulator means at said first axial limit thereof, a hydraulic sender unit adapted to be mounted at a remote distance from said frame and said receiver unit, a hydraulic chamber in said sender unit, a diaphragm defining a wall of said chamber, a hydraulic chamber in said receiver unit at least partially defined by said diaphragm therein, a conduit interconnecting said hydraulic chambers in said units, therein to in turn act on the fluid in said chambers to adjust the temperature of operation of said switch assembly and accordingly the temperature of operation of any said vessel on the heater.

10. A thermostatic switch assembly for use with an electrical heater having an upper surface adapted to receive a vessel and having a central aperture to receive the switch assembly, said switch assembly including a housing with a closed generally flat top, spring means urging the top of said switch assembly housing upwardly, a bimetal blade bent into an L shape with one leg riveted to the top of said housing and disposed within said housing, an insulator carried on the other leg of said bimetal blade, said other leg of said bimetal blade depending within said housing, a stack type switch mechanism with a base, means mounting said base on a side wall of said housing, first and second blades in said stack type switch mechanism fixed on said base with said first and second blades carried in the bottom of said housing and with said blades extending generally upwardly in said housing, said first blade extending into close proximity to said insulator on said bimetal blade to be actuated thereby, first and second contacts carried on said first and second blades for mutual co-operation and adapted to control directly the energization to the electrical heater, a hydraulic receiver unit mounted on a side wall of said housing, a diaphragm in said receiver unit movable generally perpendicular to said second switch blade, insulator means on said receiver unit passing through apertures in said housing side wall and said first blade and acting on said second blade to adjust the position of same, first and second axial limits of said insulator means relative to said housing, a positive off abutment fixed on a side wall of said housing and adapted to engage said insulator on said bimetal blade at normal room temperature to maintain said contacts out of engagement with said insulator means at said first axial limit thereof, a hydraulic sender unit adapted to be mounted at a remote distance from said housing and said receiver unit, a hydraulic chamber in said sender unit, a diaphragm defining a wall of said chamber, a hydraulic chamber in said receiver unit at least partially defined by said diaphragm therein, a conduit interconnecting said hydraulic chambers in said units, and control means in said sender unit acting on said diaphragm therein to in turn act on the fluid in said chambers to adjust the temperature of operation of said switch assembly and accordingly the temperature of operation of any said vessel.

11. A surface heater and control bimetal switch assembly comprising, in combination, an electrical heater having an upper horizontal surface adapted to receive a cooking vessel, a central aperture in said surface heater, a switch assembly disposed in said central aperture, said switch assembly including an inverted cup housing with a vertical axis and a closed flat top, spring means urging the top of said switch assembly housing above the level of said surface heater, a sensing button fixedly disposed through the closed top of said switch assembly housing for abutment by a cooking vessel on said surface heater, a bimetal blade bent into an L shape with one leg riveted to said sensing button in the top of said housing and disposed within said housing, an insulator button carried on the other leg of said bimetal blade, said other leg of said bimetal blade depending within said cup shaped housing generally parallel to the vertical axis of said housing, a stack type switch mechanism with a base, means mounting said base on a side wall of said housing separately from said bimetal blade, first and second blades in said stack type switch mechanism fixed on said base with said first and second blades carried in the bottom of said housing and with said blades extending generally upwardly along the axis of said housing, said first blade extending into close proximity to the front of said insulator button to be actuated thereby, first and second contacts carried on said first and second blades for mutual co-operation, actuator means in said switch mechanism including insulator means movable along a second axis generally perpendicular to said housing axis, said insulator means passing through apertures in said housing side wall and said first blade and acting on said second blade to adjust the position of same, first and second axial limits of said insulator means relative to said housing, a positive off abutment fixed on a side wall of said housing and engaging the rear of said insulator button at normal room temperature to maintain said contacts out of engagement with said insulator means at said first axial limit thereof, means directly connecting said first and second contacts in series with said electrical heater to control the energization thereto, and a manual control knob mounted outside the periphery of said surface heater and connected to move said actuator means to adjust the temperature of operation of said switch assembly and accordingly the temperature of operation of said cooking vessel.

12. A thermostatic switch assembly for use with an electrical heater having an upper horizontal surface adapted to receive a cooking vessel and having a central aperture to receive the switch assembly, said switch assembly including an inverted cup housing with a vertical axis and a closed flat top, spring means urging the top of said switch assembly housing upwardly, a sensing button fixedly disposed through the closed top of said switch assembly housing for abutment by any cooking vessel on the surface heater, a bimetal blade bent into an L shape with one leg fastened to said sensing button in the top of said housing and disposed within said housing, an insulator button carried on the other leg of said bimetal blade, said other leg of said bimetal blade depending within said cup shaped housing generally parallel to the vertical axis of said housing, a stack type switch mechanism with a base, means mounting said base on a side wall of said housing, first and second blades in said stack type switch mechanism fixed on said base with said first and second blades carried in the bottom of said housing and with said blades extended generally upwardly along the axis of said housing, said first blade extending into close proximity to the front of said insulator button to be actuated thereby, first and second contacts carried on said first and second blades for mutual co-operation and adapted to be connected to directly control the energization to the electrical heater, a hydraulic receiver unit mounted on a side wall of said housing, a diaphragm in said receiver unit movable along a second axis generally perpendicular to said housing axis, insulator means on said receiver unit passing through apertures in said housing side wall and said first blade and acting along said second axis and on said second blade to adjust the position of same, first and second axial limits of said insulator means relative to said housing, a positive off abutment fixed on a side wall of said housing and adapted to engage the rear of said insulator button at normal room temperature to maintain said contacts out of engagement with said insulator means at said first axial limit thereof, a hydraulic sender unit adapted to be mounted at a remote distance from said housing and said receiver unit, a hydraulic chamber in said sender unit, a diaphragm defining a wall of said chamber, a hydraulic chamber in said receiver unit at least partially defined by said diaphragm therein, a conduit interconnecting said hydraulic chambers in said units, a rotatable screw in said sender unit acting on said diaphragm therein to in turn act on the fluid in said chambers, and a control knob fixed on the outer end of said screw to adjust the temperature of operation of said switch assembly and accordingly the temperature of operation of any said cooking vessel.

13. A surface heater and control bimetal switch assembly, comprising in combination, an electrical surface heater having an upper horizontal surface adapted to receive a cooking vessel, a central aperture in said surface heater, a switch assembly including a housing with closed generally flat top, spring means urging the top of said switch assembly housing above the level of said surface heater, a sensing button fixedly disposed through the closed top of said switch assembly housing for abutment by a vessel or said surface heater, a bimetal blade bent into an L shape with one leg riveted to said sensing button in the top of said housing and disposed within said housing, an insulator carried on the other leg of said bimetal blade, said other leg of said bimetal blade depending downwardly within said housing, a stack type switch mechanism mounted separately from said bimetal blade in the bottom of said housing and with first and second blades extending generally upwardly in said housing, said first blade extending into close proximity to said insulator on said bimetal blade to be actuated thereby, first and second contacts carried on said first and second blades for mutual co-operation and connected to directly control the energization to said electrical heater, an internally threaded nut carried on said switch mechanism at a side of said housing, a screw threaded in said nut, means defining a first rotational limit of said screw relative to said nut, insulator means on said screw passing through an aperture in said first blade and acting on said second blade to adjust the position of same, a positive off abutment fixed on a side wall of said housing and adapted to act on said bimetal blade at normal room temperature to maintain said contacts out of engagement with said screw at said first rotational limit thereof, and a control knob connected to rotate said screw from a position beyond the outer peripheral edge of said surface heater to adjust the temperature of operation of said switch assembly and accordingly the temperature of operation of said vessel.

14. A surface heater and control bimetal switch assembly comprising, in combination, an electrical heater having an upper horizontal surface adapted to receive a cooking vessel, a central aperture in said surface heater, a switch assembly disposed in said central aperture, said switch assembly including an inverted stainless steel cup housing with a vertical axis and a closed flat top, spring means urging the top of said switch assembly housing above the level of said surface heater, an aluminum sensing button fixedly disposed through the closed top of said switch assembly housing for abutment by a cooking vessel on said surface heater, a bimetal blade bent into an L shape with one leg riveted to said sensing button in the top of said housing and disposed within said housing, a porcelain button carried on the other leg of said bimetal blade, said other leg of said bimetal blade depending within said cup shaped housing generally parallel to the vertical axis of said housing, a stack type switch mechanism with a base, means mounting said base on a side wall of said housing, first and second blades in said stack type switch mechanism fixed on said base with said first and second blades carried in the bottom of said housing and with said blades extended generally upwardly along the axis of said housing, said first blade extending into close proximity to the front of said porcelain button to be actuated thereby, first and second contacts carried on said first and second blades for mutual co-operation and connected to directly control the energization to said heater, a hydraulic receiver unit mounted on said base of said switch mechanism, a diaphragm in said receiver unit movable along a second axis generally perpendicular to said housing axis, insulator means on said receiver unit passing through apertures in said housing side wall and said first blade and acting along said second axis and on said second blade to adjust the position of same, first and second axial limits of said insulator means relative to said housing, a positive off abutment fixed on a side wall of said housing and adapted to engage the rear of said porcelain button at normal room temperature to maintain said contacts out of engagement with said insulator means at said first axial limit thereof, a hydraulic sender unit adapted to be mounted at a remote distance from said housing and said receiver unit, a hydraulic chamber in said sender unit, a diaphragm defining a wall of said chamber, a hydraulic chamber in said receiver unit at least partially defined by said diaphragm therein, a conduit interconnecting said hydraulic chambers in said units, a rotatable screw in said sender unit acting on said diaphragm therein to in turn act on the fluid in said chambers, and a control knob fixed on the outer end of said screw to adjust the temperature of operation of said switch assembly and accordingly the temperature of operation of any said cooking vessel.

15. A surface heater and control bimetal switch assembly, comprising in combination, an electrical surface heater having an upper horizontal surface adapted to receive a cooking vessel, a central aperture in said surface heater, a switch assembly disposed in said central aperture, said switch assembly including an inverted stainless steel cup housing with a vertical axis and a closed flat top, spring means urging the top of said switch assembly housing above the level of said surface heater, an aluminum sensing button fixedly disposed through the closed top of said switch assembly housing for abutment by a cooking vessel on said surface heater, a bimetal blade bent into an L shape with one leg riveted to said sensing button in the top of said housing and disposed within said housing, a porcelain button carried on the other leg of said bimetal blade, said other leg of said bimetal blade depending within said cup shaped housing generally parallel to the vertical axis of said housing, a stack type switch mechanism with a base, means mounting said base on a front side wall of said housing, first and second blades in said stack type switch mechanism fixed on said base with said first and second blades carried in the bottom of said housing and with said blades extended generally upwardly along the axis of said housing, said first blade extending into close proximity to the front of said porcelain button to be actuated thereby, first and second contacts carried on said first and second blades for mutual co-operation and connected to directly control energization to said heater, an internally threaded nut fixedly carried on the front side wall of said housing, a screw threaded in said nut, first and second rotational limits of said screw relative to said nut, insulator means on said screw passing through an aperture in said first blade and acting on said second blade to adjust the position of same to control the temperature of operation of said heater and hence of said vessel, a positive off abutment fixed on a rear side wall of said housing and adapted to engage the rear of said porcelain button at normal room temperature to maintain said contacts out of engagement with said screw at said first rotational limit thereof, a rotatable screw extension connected by a universal joint to the front of said screw and extending to a position beyond the outer front edge of said surface heater, and a control knob fixed on the outer end of said screw extension to adjust the temperature of operation of said switch assembly and accordingly the temperature of operation of said cooking vessel.

References Cited

UNITED STATES PATENTS

| | | | |
|---|---|---|---|
| 2,288,510 | 6/1942 | Brannon | 219—450 |
| 2,820,129 | 1/1958 | Long et al. | 219—450 |
| 3,221,123 | 11/1965 | Huffman | 219—450 |
| 2,790,057 | 4/1957 | Schauer | 219—452 |

FOREIGN PATENTS 674,959 7/1952 Great Britain.

RICHARD M. WOOD, *Primary Examiner.*

L. H. BENDER, *Assistant Examiner.*